March 30, 1965  A. MAURER ETAL  3,175,661
FREEWHEEL CLUTCH WITH TILTABLE SPRAGS
Filed April 27, 1962  2 Sheets-Sheet 1

INVENTORS
Albrecht Maurer
Emil Giese
BY
Bailey, Stephens & Huettig
ATTORNEYS

3,175,661
FREEWHEEL CLUTCH WITH TILTABLE SPRAGS
Albrecht Maurer and Emil Giese, both of Bad Homburg vor der Hohe, Germany, assignors to Ringspann Albrecht Maurer K.G., Bad Homburg vor der Hohe, Germany, a firm of Germany
Filed Apr. 27, 1962, Ser. No. 190,711
Claims priority, application Germany, Apr. 29, 1961, R 30,210; Mar. 7, 1962, R 32,227
14 Claims. (Cl. 192—45.1)

The present invention relates to a freewheel clutch which is provided between the concave cylindrical clamping surface of the race forming the outer clutch member and the convex cylindrical clamping surface of the race forming the inner clutch member with tiltable sprags which are pressed simultaneously against the inner and outer races merely by a spring force rather than by the action of centrifugal forces.

It is a well-known fact that the length of service of such a sprag-type clutch is generally limited by the wear upon the contact surfaces of the sprags at their points of engagement with the clamping surface of the inner race and by the resulting flattening of these contact surfaces. Although the wear and flattening of the sprags may be reduced to some extent by the use of highly wear-resistant materials and high-grade lubricating oils, such an oil will reduce the coefficient of friction between the sprags and the clamping surfaces of the inner and outer clutch races to such an extent that it is hardly possible to effect a reliable transmission of forces when a change in the relative speed of the two clutch races occurs, that is, when the clutch is engaged.

In the production of freewheel clutches of the sprag type in which the outer clutch race revolves at a high speed, the sprags are therefore now frequently designed so as to be tilted and thereby lifted from the clamping surface of the inner clutch race by the centrifugal force acting thereon and against the action of their spring or springs, so that the wear upon the sprags will be reduced as much as possible. Such freewheel clutches can, however, be engaged only at a standstill or at low speeds of the outer race, that is, at a time when the centrifugal force acting upon the sprags is overcome by the force of the spring or springs of the sprags. Such freewheel clutches in which the sprags are lifted off the inner race by the centrifugal force are therefore useless when the clutch should be engaged at higher speeds of the inner and outer races. Such freewheel clutches in which the sprags are disengaged by centrifugal force have the further disadvantage that, when the clutch is engaged at a standstill or at low speeds of the outer race, there is a possibility that the clutch may become unintentionally disengaged. This will occur when the clutch reaches a high speed in the engaged position and when a variation occurs in this high speed and when the torque to be transmitted decreases to zero. Since the sprags then do not have to transmit any force, they may be lifted from the clamping surface of the inner race under the effect of the centrifugal force. A reengagement of the clutch when the speed of the outer race decreases then occurs with a hard impact which may damage or even break the clutch.

There are also other known freewheel clutches of the sprag type in which the center of gravity of the sprags lies within their tilting axis so that the centrifugal force cannot lift the sprags off the clamping surface of the inner clutch race against the action of the sprag spring. At high relative speeds between the inner and outer races of the clutch, a considerable wear occurs between the contact surfaces of the sprags and the clamping surface of the inner race since the sprags must always be held ready for engagement by the spring force.

In order to reduce this disadvantage of a constant wear which is caused in these freewheel clutches by the continuous sliding of the contact surfaces of the sprags along the clamping surface of the inner race as the result of the spring pressure on the sprags, efforts have in the past been made to lift the sprags off this clamping surface at a relative rotation of both clutch members by the provision of a slip ring or cage, the rotation of which is slightly retarded by its movement relative to the inner race. This solution has, however, not proved fully satisfactory because the retarding of the movement of the cage necessarily involves wear and furthermore because the sprags which are lifted off the clamping surface of the inner race by the retarded cage remain disengaged from this surface until the inner race runs at a speed exceeding the synchronous speed of both clutch races. Since the sprags will therefore not reengage with the clamping surface of the inner race until this time, a very hard and disagreeable torque impact often occurs. This disadvantage is due to the fact that the braking force which acts upon the cage and lifts the sprags is practically independent of the relative speed between the cage and the inner race.

It is an object of the present invention to provide a freewheel clutch which overcomes the above-mentioned disadvantages of the known types of freewheel clutches. More particularly, it is an object of the invention to provide a freewheel clutch of the sprag type which in the freewheeling operation permits the inner and outer members or races of the clutch to run at high relative speeds and also permits the clutch to be engaged without any impact at any desired high speeds of the inner and outer races, and which further excels by a very low wear and a very long period of excellent service.

In order to attain these objects, it is necessary in the freewheeling operation of the clutch to lift the sprags off the clamping surface of the inner race and at the same time to insure that, when the two clutch races approach the synchronous speed, the force which has lifted the sprags will become smaller than the spring force which tends to maintain all of the sprags in engagement with the clamping surfaces of the inner and outer races. The contact surfaces of the sprags should therefore reengage with the clamping surface of the inner race even before the two races reach their synchronous speed so that when this speed is reached, the clutch will engage without any torque impact. Since the requirement should also be fulfilled that the engagement of the clutch should be possible at any speeds of the inner and outer races, it is not possible to employ the centrifugal force for lifting the sprags off the inner race but, on the contrary, efforts must be made to prevent any influence of the centrifugal force upon the sprags during the freewheeling operation of the clutch.

A practical solution of the objects of the invention therefore requires a freewheel clutch of the type which is provided with tiltable sprags between the concave cylindrical clamping surface of the outer race and the convex cylindrical clamping surface of the inner race, and in which these sprags are pressed simultaneously against the clamping surfaces of both races merely by a spring force and not by the action of centrifugal forces. For attaining the mentioned objects, the invention provides that at least during the relative movement between the inner and outer clutch members or races in the freewheeling direction a current of pressure oil is injected into the clutch from one end thereof so as to flow into and through the gaps which are formed between the adjacent sprags and the inner races, and further that this oil current flows in a direction which differs from the direction of movement of the sprags relative to the inner race. The effect of these inventive features may be explained as follows:

If continuously or at least at the beginning of the freewheeling operation a current of pressure oil is passed into the gaps between the adjacent sprags and the inner race from one end of the clutch, for example, exactly in the axial direction, this oil current will have the same peripheral speed as the inner race and, when the clutch is engaged, as the sprags. During the freewheeling operation, all sprags move together relative to the inner race and thereby carry out a movement relative to the inner race and thus a movement in a direction to the oil current flowing through the gaps. By the movement of the sprags transverse to the direction of the oil current, the oil current is deflected in a different direction and thereby exerts upon the sprags a force which is dependent upon the speed of the sprags relative to the inner race and which lifts the sprags off the clamping surface of the inner race against the action of the spring force which presses the sprags against the inner and outer races. On the other hand, when the two clutch races approach the synchronous speed, the hydrodynamic lifting force as above explained decreases to such an extent that, due to the spring force acting upon the sprags, the latter will be reengaged with the clamping surface of the inner race and will thus be placed in the position ready for engagement even before the two clutch races reach their synchronous speed.

Of course, the oil current does not need to flow exactly in the axial direction, that is, tranvsersely through the gaps between the sprags at the speed of rotation of the inner race, but it suffices if it flows in a direction which deviates from the direction of movement of the sprags relative to the inner race. The important fact is merely that the direction of flow of the oil current extends at an angle to the direction of movement of the sprags. If this angle is less than 90°, the hydrodynamic lifting effect will not occur until the two races run at higher relative speeds, while at angles of more than 90°, the sprags will be lifted off the inner race sooner than in the first mentioned case.

For injecting the oil current into the gaps between the sprags, it has been found advisable to provide at one end of the clutch an annular pressure-oil chamber which together with the clamping surface of the inner race forms a narrow annular inlet slot for the pressure oil which may then be injected through this slot at the entire periphery thereof into all gaps. The pressure-oil chamber may revolve together with the inner race. The oil current entering into the gaps will then have the same peripheral speed as the inner race and the direction of movement of the sprags in the freewheeling operation therefore forms an angle of 90° to the direction of flow of the oil current. The pressure-oil chamber may, however, also be rotated together with the outer race of the clutch. Since the inlet slot for the pressure oil is then limited by a part of the pressure-oil chamber which revolves with the outer race and by the clamping surface of the inner race, the oil current will in the engaged position of the clutch at first have the same peripheral speed as the inner race, while when the relative speed of the outer race increases, the oil current entering through the inlet slot into the gaps between the sprags will be given an additional speed component in the peripheral direction relative to the inner race. The angle between the direction of the oil current and the direction of movement of the sprags will therefore become smaller than 90°.

In applying the invention, it has further been found advisable to cover the end of the clutch opposite to the end containing the pressure-oil inlet by means of a baffle disk which revolves with the outer race and forms together with the inner race a narrow annular outlet slot for the pressure oil. This permits the required amount of pressure oil passing through the clutch to be considerably reduced. If the outlet slot is made of a diameter smaller than that of the clamping surface of the inner race, it will be insured that the quantity of oil contained in the gaps between the sprags will reach up to the clamping surface of the inner race and cannot become separated therefrom by centrifugal forces.

In certain cases, when during the freewheeling operation the outer clutch race always has a definite minimum speed, it is possible to design the freewheel clutch according to the invention so as also to serve as a centrifugal pump for producing the required current of pressure oil. For this purpose, one end of the clutch is preferably sealed tightly to prevent the discharge of pressure oil, while the pressure-oil chamber at the other end is deisgned as a pump which may consist of a part which revolves with the outer race and is provided with oil return openings and of a part which revolves with the inner race and is provided with pump blades.

A pump construction of a very advantageous design consists according to another modification of the invention in the provision of an annular chamber in the outer race of the clutch for receiving a ring of lubricant which is formed by the action of the centrifugal force, and in providing at least one oil-withdrawing element which is connected to the inner race and is partly immersed into the ring of lubricant so as to conduct a current of pressure oil through the gaps between the sprags which thereafter will be returned to the annular chamber through oil return channels in the outer race. Even at low speeds of the outer race and independent of the speed of the inner race, the lubricant—normally in the form of lubricating oil—will be forced by the action of the centrifugal force toward the outer wall of the annular chamber which is provided in the outer race. This effect continues regardless of whether the outer race revolves at a low or high speed, that is, practically within the entire speed range of the clutch. If the inner race runs at the same speed as the outer race, no oil will be conveyed since the oil-withdrawing element which is secured to the inner race revolves at the same speed as, or even at a slightly higher speed than the ring of lubricant which is formed as the result of the centrifugal force. Not until there is a change in speed, that is, when the outer race and the ring of lubricant in the annular chamber thereof run faster than the inner race, the oil-withdrawing element which is secured to the inner race will take up lubricant and conduct the same radially toward the inside and into the gaps between the adjacent sprags. By this inventive design of the pump portion of the freewheel clutch, it is therefore possible to attain the best possible pumping efficiency within the clutch. When the inner and outer clutch races run at the same speed, the pump remains inoperative and the sprags are then pressed by the spring force against the clamping surfaces of the inner and outer races. As soon as a relative speed occurs, that is, when the outer race starts to run faster than the inner race and the ring of lubricant in the annular chamber of the outer race is accelerated, oil is withdrawn from this chamber and passed into the gaps between the sprags, whereby the sprags will be lifted off the convex cylindrical clamping surface of the inner race and remain lifted until this relative speed again approaches the speed of zero and the sprags will again engage with the concave cylindrical clamping surface of the outer clutch race and the convex cylindrical clamping surface of the inner race. Since the transition between the lifting of the sprags and the wedging thereof occurs smoothly and continuously, no impact can occur upon the clutch members which might damage the same.

Another feature which has proved to be of advantage consists in the provision of lateral ribs in the annular chamber of the outer race which extend substantially in radial directions within this chamber. By providing such ribs in the annular chamber, the oil contained in the clutch will be conveyed even at very low speeds toward the outer wall of the annular chamber within the outer race. This construction renders the oil pump operative even at very low speeds, that is, for example, even at such a time when the inner race is stationary and the outer race is driven at a comparatively low speed. Furthermore, the ribs prevent the speed of the ring of lubricant from falling behind the speed of the outer race so that this ring will never revolve at a considerably lower speed than the outer race.

A very simple and efficient construction of such an oil-withdrawing element consists of a scooping tube which projects from the inner race into the ring of lubricant in the annular chamber of the outer race and has an inlet opening within this chamber facing in the direction opposite to the direction of rotation of the outer race.

If the oil-withdrawing element is provided in the form of such an oil-scooping tube, the oil current which is directed toward the inlet opening of the scooping tube will produce a pressure head which is then exerted in the gaps between the adjacent sprags and the inner race so as to lift the sprags from the inner race. This pressure head may also be varied by changing the size or shape of the inlet opening of the scooping tube.

Since the annular chamber which is provided in the outer race for receiving the ring of lubricant, and also the oil scooping tube which is secured to the inner race take up very little space, the freewheel clutch containing such a pump may be made of a symmetrical shape. This has the advantage that the clutch may be employed for either direction of rotation even though the pump conveys the oil only in one direction. Since according to the invention the pressure-oil current is required, however, only when the clutch is in the freewheeling condition and since the freewheeling direction is definitely set by the sprags, there is also no need for any pumping of oil except in the freewheeling direction. If a freewheel clutch of such a symmetrical design is to be employed for operating in the opposite direction of rotation, it is merely necessary to turn the entire clutch around 180°.

In all other cases, the required pressure oil is supplied by a separate oil pump which feeds the oil to the pressure-oil chamber either through the inner race or the outer race of the clutch.

The aforementioned objects, features, and advantages of the present invention will become more clearly apparent from the following detailed description of several preferred embodiments thereof as illustrated in the accompanying drawings, in which—

FIGURE 10 shows a longitudinal section of the upper half of a freewheel clutch according to still another modification of the invention; while

Figure 1:
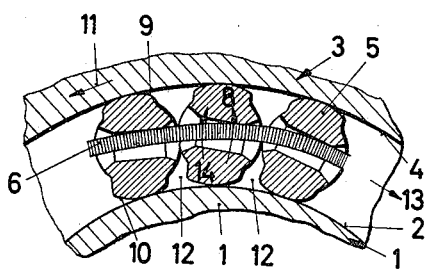
FIGURE 1 shows a cross section of a part of a freewheel clutch according to the invention.
Figure 2:
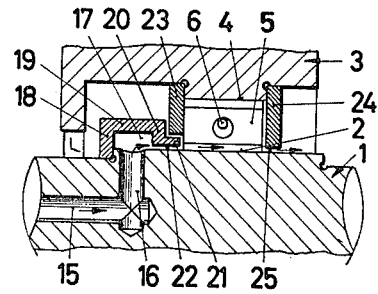
FIGURE 2 shows a longitudinal section of one half of the clutch according to FIGURE 1.
Figure 3:
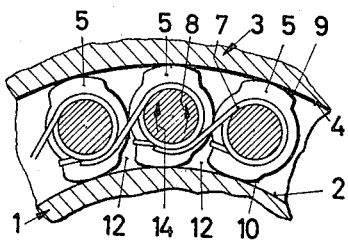
FIGURE 3 shows a cross section of a part of a freewheel clutch according to a modification of the invention.

As illustrated particularly in FIGURES 1 to 3, the free wheel clutch according to the invention consists of an inner race 1 forming the inner clutch member with a convex cylindrical clamping surface 2, and an outer race 3 forming the outer clutch member with a concave cylindrical clamping surface 4. Between the outer and inner races sprags 5 are inserted which are acted upon either by a common spring ring 6, as shown in FIGURE 1 or by individual springs 7, as shown in FIGURE 3, so as to be tilted in the direction of the arrow 8, whereby their opposite contact surfaces 9 and 10 are maintained in engagement with the clamping surfaces 2 and 4. As soon as the outer clutch race 3 tends to move relative to the inner clutch race 1 in the direction of the arrow 11, sprags 5 are wedged between the two races and thus connect the latter positively to each other. If a relative movement occurs between the outer race 3 and the inner race 1 in the direction opposite to that of the arrow 11, the wedging action of the sprags discontinues and the outer race 3 can move together with all of the sprags relative to the inner race 1. In the clutches according to FIGURES 1 and 3, the contact surfaces 10 of sprags 5 are then held by spring 6 or springs 7 in sliding engagement with the clamping surface 2 of the inner clutch race 1 and slide along the latter. Insofar as the freewheel clutch according to the invention has above been described, its structure and operation correspond with those of the conventional clutches of this type.

According to the present invention, a current of oil under pressure is now passed in a direction substantially vertical to the plane of the drawing through the gaps 12 which are formed between the adjacent sprags 5 and the clamping surface 2 of the inner clutch race 1. If the outer clutch race 3 moves together with the complete set of sprags relative to the inner clutch race 1 in the direction of the arrow 13, the oil current which enters the gaps 12 substantially vertically to the plane of the drawing will be deflected and will thereby exert upon sprags 5 a force which will tilt them against the action of their spring or springs in the direction of the arrow 14 and thereby lift the contact surfaces 10 of the sprags off the clamping surface 2 of the inner race 1 so that the two races will run relative to each other without wear. As the speeds of the two clutch races become more and more synchronous, the tilting force which is produced hydraulically and acts upon the sprags in the direction of the arrow 14 becomes gradually smaller than the tilting force which is produced by the spring or springs and acts in the direction of the arrow 8. Consequently, the contact surfaces 10 of the sprags will reengage with the clamping surface 2 of the inner race even before the two clutch races run at a synchronous speed.

Figure 6:
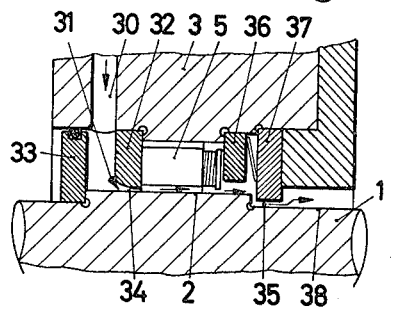
FIGURE 6 shows a longitudinal section also similar to FIGURE 4 of a further modification of the invention.
Figure 7:
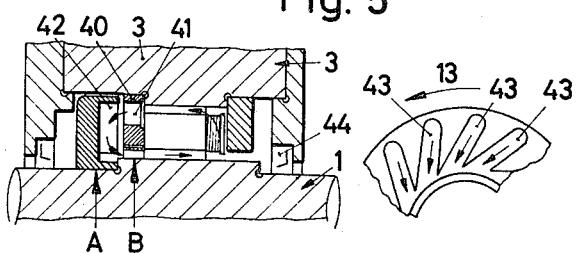
FIGURE 7 shows a longitudinal section similar to FIGURE 4 of a further modification of the invention.
Figure 8:
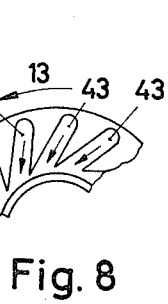
FIGURE 8 shows a partial view as seen within the plane A in FIGURE 7.
Figure 9:
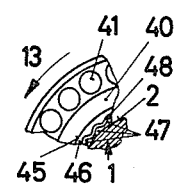
FIGURE 9 shows a partial view as seen within the plane B as in FIGURE 7.
Figure 10:
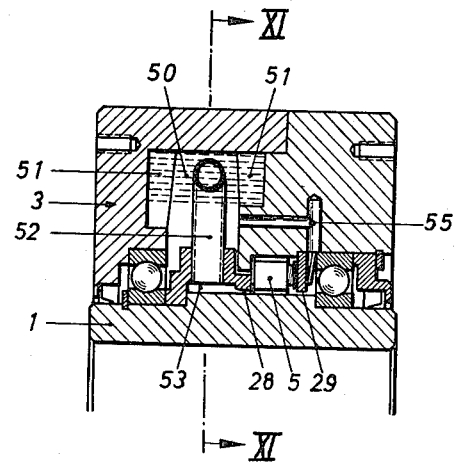
Figure 11:
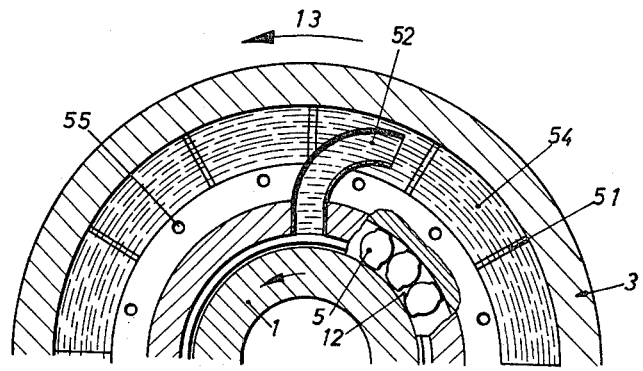
FIGURE 11 shows a cross section taken along line XI—XI of FIGURE 10, in which some of the parts are broken away to illustrate some of the sprags of the clutch.

In FIGURES 2 to 6, different possibilities are illustrated in which the current of pressure oil may be conducted into the freewheel clutch, while FIGURES 7 to 9 illustrate the manner in which such a freewheel clutch may be designed so as also to serve as a centrifugal pump. FIGURES 10 and 11 finally show a further design of a pressure-oil pump which is installed within the freewheel clutch. In all of these drawings, those parts which are similar to the parts as are already described with reference to FIGURES 1 to 5 are also identified by the same reference numerals.

In the first embodiment of the invention as illustrated in FIGURE 2, the pressure oil is supplied by a pump, not shown, through an axial channel 15 and a radial channel 16 in the inner clutch race 1 to a pressure oil chamber 17 which consists of a cylinder 19 which has an end wall 18 and is rigidly secured to the inner race 1. The opposite end wall 20 of cylinder 19 carries a flange 21 which together with the clamping surface 2 of the inner race defines a narrow annular slot 22 serving as an inlet port for the pressure oil. Sprags 5 are laterally guided at both sides by guide disks 23 and 24 which are rigidly secured to the outer clutch race 3 so that the pressure oil after entering through the annular slot 22 must pass through the gaps 12 between the adjacent sprags 5. In this embodiment of the invention, guide disk 24 also serves as a baffle plate for the oil current since together with the inner race it forms a narrow annular slot 25 which serves as an outlet port.

Figure 4:
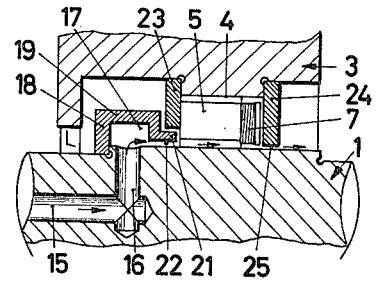
FIGURE 4 shows a longitudinal section of the upper half of the clutch according to FIGURE 3.
Figure 5:
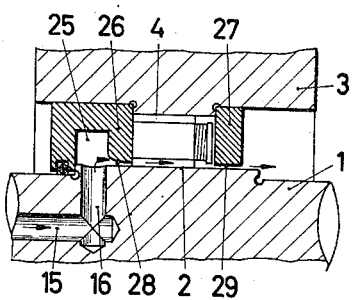
FIGURE 5 shows a longitudinal section similar to FIGURE 4 of another modification of the invention.

FIGURE 4 illustrates the same means for supplying the current of pressure oil by means of a pressure-oil chamber 17 which revolves together with the inner clutch race 1. The only difference between this and the previous embodiment of the invention is the fact that, while according to FIGURES 1 and 2 all of the sprags 5 are acted upon by a common coil spring 6, they are each provided in FIGURES 3 and 4 with an individual spring 7.

By passing through the annular inlet slot 22 into the gaps 12 between sprags 5, the entering current of pressure oil is given the shape of a cylindrical tube which revolves at the speed of the inner clutch race 1. Relative to the clamping surface 2 of this inner race 1 which may run at any desired speed, this oil current therefrom flows in a direction which coincides with a generatrix of the convex cylindrical clamping surface 2. If the outer clutch race 3 together with the set of sprags 5 moves in the freewheel operation relative to the inner member 1, sprags 5 carry out a movement in the peripheral direction relative to the clamping surface 2 of the inner race, that is, a movement which extends vertically to the direction of flow of the oil current.

FIGURE 5 again illustrates the oil feed extending in the same manner as in FIGURES 2 and 4 through an axial channel 15 and a radial channel 16 in the inner clutch race to a pressure chamber 25 which in this case, however, revolves together with the outer race 3. Guide disk 26 which is secured to the outer race 3 is provided at the inside with an annular recess which forms the pressure chamber 25. Together with the clamping surface 2 of the inner clutch race, guide disk 26 forms—similarly as in FIGURES 2 and 4—a narrow annular slot 28 through which the pressure oil can flow from chamber 25 into the gaps 12 between the adjacent sprags 5.

When the clutch is in the engaged position, the oil flows in the same manner as in FIGURES 2 and 4 through the inlet slot 28 in the form of a cylindrical tube which revolves at the same speed as the inner clutch race 1. When the clutch is in the freewheeling position, the movement of the outer race 3 and the guide disk 26 thereon relative to this oil current in the inlet slot 28 results in a peripheral speed of the oil current in slot 28 which lies between the peripheral speed of the inner race 1 and the prevailing peripheral speed of the outer race 3. The oil current is thus given an additional speed component in the peripheral direction so that the angle between the oil current entering into gaps 12 and the direction of movement of the set of sprags amounts in the freewheeling operation to less than 90°. The lifting of the sprags as the result of the deflection of the oil current in gaps 12 therefore does not occur until slightly higher relative speeds are reached. The oil outlet slot 29 at the end of the clutch opposite to the pressure chamber 25 is formed by the guide disk 27 which revolves together with the outer clutch race in cooperation with the clamping surface 2 of the inner clutch race.

FIGURE 6 illustrates a further structural modification of the invention in which the oil current is conducted through a radial channel 30 in the outer clutch race 3 to an oil pressure chamber 31, the lateral walls of which are formed by a guide disk 32 for sprags 5 which revolves with the outer race 3 and by a disk 33 which revolves with the inner clutch race 1. The inlet slot 34 is also in this case formed between the inner clamping surface 2 of the inner race 1 and the guide disk 32 so that insofar as the oil feed and the direction of the oil current relative to the inner race 1 are concerned, substantially the same conditions prevail as in the embodiment according to FIGURE 5. In the embodiment according to FIGURE 6, the oil outlet slot 35 has a smaller diameter than the clamping surface 2 of the inner race. For this purpose, aside from the guide disk 36 for sprags 5 a further disk 37 is provided which is likewise secured to and thus revolves with the outer race 3 and has a bore of a diameter only slightly larger than a reduced cylindrical surface 38 of the inner race 1. This insures that the oil current flowing through the gaps 12 will not separate from the clamping surface 2 of the inner race as the result of centrifugal forces.

FIGURE 7 illustrates a freewheel clutch which also serves as a centrifugal pump for producing the required oil current for the operation of the clutch. For this purpose, the guide disk 40 which revolves together with the outer clutch race 3 at the side of the oil pressure chamber is provided adjacent to the clamping surface 4 of the outer race 3 with oil return openings 41 which permit the oil which is circulated by the centrifugal force to flow back to the oil pressure chamber 42. This chamber is limited laterally by a disk, as shown in detail in FIGURE 8, which revolves with the inner clutch race 1 and is provided with blades which in this case are formed by milled-out recesses 43. At the end of the clutch opposite to this pump portion, the oil is prevented from emerging by means of a suitable gasket 44. This type of construction is practical if the outer race 3 of the clutch when running in the freewheeling operation rotates at a considerable speed since only in that case the required pumping effect will be attained. The flow of oil through the gaps 12 will therefore also not start until the outer and inner races 3 and 1 begin to move relative to each other.

Obviously, the parts 40 and 42 which form the pump portion of the clutch may also be designed, for example, in the manner of a Sihi pump, so that a pumping action will be attained when the inner clutch race runs at a considerable speed.

FIGURE 9 illustrates once more the guide disk 40 with its oil return openings 41 in a front view thereof and it also shows a further modification. The slot which is formed by the wall of bore 45 in guide disk 40 and by the clamping surface 2 of the inner clutch race 1 is relatively wide. On the other hand, this inlet slot 46 contains an oil guide ring 48 which is provided with longitudinal grooves or corrugations 47 and is mounted on the inner race 1. These longitudinal grooves may extend either at an inclination or helically to the axis of rotation of the inner race so that the oil current entering the gaps 12 may be given such a direction that, for example, together with the direction of movement of the set of sprags in the freewheeling condition of the clutch, it will enclose an angle of more than 90°. In such a case, a stronger deflection of the oil current will be effected with the result that the sprags will already disengage from the inner clutch race at lower relative speeds. Obviously, an oil guide ring as described with reference to FIGURE 9 may also be applied in the embodiments of the invention as illustrated in FIGURES 2, 4, 5, and 6.

FIGURES 10 and 11 illustrate a further modification of such a pressure-oil pump in which in the outer member 3 of the freewheel clutch an annular chamber 50 is provided in which a ring 54 of lubricating oil is formed when the outer race of the clutch rotates. The lateral walls of the annular chamber 50 are provided with ribs 51 by means of which when a rotation occurs the lubricant which in the position of rest collects in the lower part of the clutch will be conveyed upwardly. These ribs therefore contribute to the starting centrifugal effect and also insure that the ring of lubricant 54 will revolve at a speed which is not considerably lower than that of the outer clutch race 3.

The inner clutch race 1 carries an oil-withdrawal element 52 which conducts the lubricant from the ring of lubricant 54 into an oil guide ring 53 from which it then enters through the oil outlet slot 28 into the gaps 12 which it leaves again through the outlet slot 29 in order to flow through oil return channels 55 back into the annular chamber 50. In FIGURE 11, the oil-withdrawal element 52 is illustrated in the form of a scooping tube the opening of which faces in the direction opposite to the direction of the freewheeling rotation 13 of the outer clutch race 3. When the inner race 1 and the outer race 3 of the clutch are in synchronous rotation, no lubricant will be conveyed but only the ring of lubricant 54 will be formed in the annular chamber 50 of the outer clutch race 3. If, however, when the outer race 3 is freewheeling, a movement occurs of the outer clutch race 3 relative to the inner clutch race 1 in the direction of the arrow 13, a pressure head is exerted by the then more quickly revolving ring of lubricant 54 upon the opening of the more slowly revolving scooping tube 52 whereby the lubricant will be forced to flow through the scooping tube 52 into the oil guide ring 53 and from the latter through slot 28, gaps 12, slot 29, and bores 55 back into the annular chamber 50.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, and means for injecting a current of pressure oil from one end side of said sprags into all of said inner gaps at least during the relative movement of said clutch members in the free-wheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member.

2. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, and means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular pressure-oil chamber adjacent to said end side of said sprags, said chamber having a side wall together with the clamping surface of said inner clutch member defining a narrow annular inlet slot through which the pressure oil may pass from said chamber simultaneously into all of said gaps.

3. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members, and adjacent to each other, spring means for pressing all of said sprags simultaneously against said clamping surfaces of said outer and inner members, said sprags being shaped so as to form gaps intermediate each pair of adjacent sprags and said inner clutch member, and means for injecting a current of pressure oil from one end side of said sprags into said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular pressure-oil chamber adjacent to said end side of said sprags and connected to and revolving with said inner clutch member, said chamber having a side wall together with the clamping surface of said inner clutch member defining a narrow annular inlet slot through which the pressure oil may pass from said chamber simultaneously into all of said gaps.

4. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, and means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular pressure-oil chamber adjacent to said end side of said sprags and connected to and revolving with said outer clutch member, said chamber having a side wall together with the clamping surface of said inner clutch member defining a narrow annular inlet slot through which the pressure oil may pass from said chamber simultaneously into all of said gaps.

5. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular pressure-oil chamber adjacent to said end side of said sprags, said chamber having a side wall together with the clamping surface of said inner clutch member defining a narrow annular inlet slot through which the pressure oil may pass from said chamber simultaneously into all of said gaps, and a baffle disk secured to and revolving with said outer clutch member and covering the other end side of said sprags and together with said inner clutch member defining a narrow annular outlet slot for the pressure oil.

6. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular pressure-oil chamber adjacent to said end side of said sprags, said chamber having a side wall together with the clamping surface of said inner clutch member defining a narrow annular inlet slot through which the pressure oil may pass from said chamber simultaneously into all of said gaps, and a baffle disk secured to and revolving with said outer clutch member and covering the other end side of said sprags, said baffle disk together with said inner clutch member defining a narrow annular outlet slot having a diameter smaller than the clamping surface of said inner clutch member.

7. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, and means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising pump means within said clutch for automatically producing said current of pressure oil.

8. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular pressure-oil chamber adjacent to said end side of said sprags, said chamber having a side wall together with the clamping surface of said inner clutch member defining a narrow annular inlet slot through which the pressure oil may pass from said chamber simultaneously into all of said gaps, and pump means within said chamber for automatically producing said current of pressure oil, and sealing means adjacent to the other end side of said sprags to prevent the discharge of pressure oil from said clutch.

9. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular pressure-oil chamber adjacent to said end side of said sprags, said chamber having a side wall together with the clamping surface of said inner clutch member defining a narrow annular inlet slot through which the pressure oil may pass from said chamber simultaneously into all of said gaps, and pump means within said chamber for automatically producing said current of pressure oil, said pump means comprising a member secured to and rotatable with said outer clutch member and having oil return openings therein, a member secured to and rotatable with said inner clutch member, and pump blades on said last member, and sealing means adjacent to the other end side of said sprags to prevent the discharge of pressure oil from said clutch.

10. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular chamber connected to and revolving with said inner clutch member, said chamber having a side wall together with the clamping surface of said inner clutch member defining a narrow annular inlet slot leading from said chamber to all of said gaps, a second annular chamber within said outer clutch member and adapted to receive a ring of oil, at least one member connected to said inner clutch member and projecting into said ring of oil in said second chamber for withdrawing oil therefrom and for conducting it under pressure into said first chamber and from the latter through said inlet slot simultaneously into and through all of said gaps, and return channels in said outer clutch member for returning the oil after passing through said gaps to said second chamber by the action of centrifugal force.

11. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular chamber connected to and revolving with said inner clutch member, said chamber having a side wall together with the clamping surface of said inner clutch member defining a narrow annular inlet slot leading from said chamber to all of said gaps, a second annular chamber within said outer clutch member and adapted to receive a ring of oil, said second chamber having lateral ribs therein extending substantially in radial directions, at least one member connected to said inner clutch member and projecting into said ring of oil in said second chamber and laterally spaced from said ribs for withdrawing oil therefrom and for conducting it under pressure into said first chamber and from the latter through said inlet slot simultaneously into and through all of said gaps, and return channels in said outer clutch member for returning the oil after passing through said gaps to said second chamber by the action of centrifugal force.

12. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular chamber connected to and revolving with said inner clutch member, said chamber having a side wall together with the clamping surface of said inner clutch member defining a narrow annular inlet slot leading from said chamber to all of said gaps, a second annular chamber within said outer clutch member and adapted to receive a ring of oil, at least one tubular member connected to said inner clutch member and having one open end terminating into said first chamber and another open end projecting into said ring of oil in said second chamber and facing in the direction opposite to the free-wheeling direction of said outer clutch member for scooping oil from said chamber and for conducting it under pressure into said first chamber and from the latter through said inlet slot simultaneously into and through all of said gaps, and return channels in said outer clutch member for returning the oil after passing through said gaps to said second chamber by the action of centrifugal force.

13. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular pressure-oil chamber adjacent to said end side of said sprags, said chamber having a side wall together with the clamping surface of said inner clutch member defining a narrow annular inlet slot through which the pressure oil may pass from said chamber simultaneously into all of said gaps, and an oil guide ring within said inlet slot and connected to said inner clutch member, said guide ring having grooves extending in a substantially longitudinal direction toward said sprags.

14. A freewheel clutch comprising an outer clutch member having a concave cylindrical clamping surface, an inner clutch member coaxial to and spaced from said outer member and having a convex cylindrical clamping surface, a plurality of tiltable sprags inserted between said outer and inner members and adjacent to each other, spring means for pressing all of said sprags simultaneously against said clamping surfaces of said outer and inner members, said sprags being shaped so as to form gaps intermediate each pair of adjacent sprags and said inner clutch member, means for injecting a current of pressure oil from one end side of said sprags into all of said inner gaps at least during the relative movement of said clutch members in the freewheeling direction and in a direction deviating from the direction of movement of the sprags relative to said inner clutch member, whereby the resistance of said oil, when the driven clutch member runs faster than the driving clutch member, tilts the sprag against the action of said spring means out of contact with the inner clutch member, said means comprising an annular pressure-oil chamber adjacent to said end side of said sprags, said chamber having a side wall together with the clamping surface of said inner clutch member defining a narrow annular inlet slot through which the pressure oil may pass from said chamber simultaneously into all of said gaps, and an oil guide ring within said slot and connected to said inner clutch member, said guide ring having grooves extending in an inclined direction toward said sprags so that said current of pressure oil will be conducted into said gaps in a direction opposite to the relative freewheeling direction of said sprags.

References Cited by the Examiner

UNITED STATES PATENTS

| | | | |
|---|---|---|---|
| 2,292,988 | 8/42 | Bloomfield et al. | 192—45 |
| 2,954,855 | 10/60 | Lund | 192—45.1 |

FOREIGN PATENTS 1,175,613   11/58   France.

DAVID J. WILLIAMOWSKY, *Primary Examiner.*

FRANK SUSKO, *Examiner.*